United States Patent [19]
Takao et al.

[11] Patent Number: 4,802,743
[45] Date of Patent: Feb. 7, 1989

[54] LIQUID CRYSTAL DEVICE HAVING COLOR FILTERS WHEREIN THE COLOR FILTERS FORMED FROM A POLYAMINO RESIN CONTAINING COLORING MATERIALS

[75] Inventors: Hideaki Takao; Taiko Motoi, both of Sagamihara; Nobuyuki Sekimura, Kawasaki; Masaru Kamio; Tatsuo Murata, both of Atsugi, all of Japan

[73] Assignee: Canon Kabushiki Kaisha, Tokyo, Japan

[21] Appl. No.: 27,308

[22] Filed: Mar. 18, 1987

[30] Foreign Application Priority Data

Mar. 20, 1986 [JP] Japan .................................. 61-060614
Aug. 30, 1986 [JP] Japan .................................. 61-202745

[51] Int. Cl.⁴ .................................................. G02F 1/13
[52] U.S. Cl. ............................ 350/339 F; 350/350 S
[58] Field of Search ................ 350/339 F, 350 S, 311, 350/317; 430/73; 525/420, 425, 436

[56] References Cited

U.S. PATENT DOCUMENTS

| | | | |
|---|---|---|---|
| 4,593,977 | 6/1986 | Takamatsu et al. | 350/339 F |
| 4,608,333 | 8/1986 | Okbayadi et al. | 525/426 |
| 4,632,514 | 12/1986 | Ogawa et al. | 350/339 F |
| 4,639,089 | 1/1987 | Okada et al. | 350/350 S |
| 4,643,531 | 2/1987 | Inoue | 350/341 |
| 4,653,862 | 3/1987 | Morozumi | 350/339 F |

FOREIGN PATENT DOCUMENTS

| | | | |
|---|---|---|---|
| 0186823 | 9/1985 | Japan | 350/339 F |
| 1045226 | 3/1986 | Japan | 350/339 F |
| 1254605 | 11/1986 | Japan | 525/426 |

*Primary Examiner*—Stanley D. Miller
*Assistant Examiner*—Huy K. Mai
*Attorney, Agent, or Firm*—Fitzpatrick, Cella, Harper & Scinto

[57] ABSTRACT

A liquid crystal device is provided which comprises a liquid crystal provided between a pair of substrates each having a transparent electrode formed thereon, and a color filter provided on at least one of the substrates, wherein the color filter comprises a film formed from a polyamino resin containing a coloring material.

38 Claims, 7 Drawing Sheets

LIQUID CRYSTAL DEVICE HAVING COLOR FILTERS WHEREIN THE COLOR FILTERS FORMED FROM A POLYAMINO RESIN CONTAINING COLORING MATERIALS

BACKGROUND OF THE INVENTION

1. Field of the Invention

The present invention relates to a color filter, and particularly to a color filter suitable for use in resolution of fine color in color image pick-up devices, color sensors, color displays and so forth. The present invention also relates to a liquid crystal device for color display, comprising a color filter built in the liquid crystal device.

2. Related Background Art

As liquid crystal devices for color display, there have been conventionally used color filters produced by vapor-deposition of a subliming dye on electrodes as disclosed in U.S. Pat. No. 4,470,667 (Y. Okubo et al.). However, the subliming dye used in Y. Okubo et al. had a problem that the color selectivity is so small and a color filter having a desired tone cannot easily be produced. Accordingly, the color display thus formed has been insufficient in color reproducibility.

U.S. Pat. No. 4,367,924 (N. A. Clark et al.), U.S. Pat. No. 4,563,059 (N. A. Clark et al.) and U.S. Pat. No. 4,639,089 (S. Okada et al.) incidentally disclose ferroelectric chiral smectic C or H liquid crystal devices exhibiting a quick response and having memory effect.

It has been attempted to apply this ferroelectric liquid crystal device to a color display by using color filters built in the crystal device. In this ferroelectric liquid crystal device, however, the distance between a pair of substrates must be controlled to be 1 $\mu$m to 2 $\mu$m, which is about 1/10 to 1/5 of conventional TN liquid crystal devices, and this distance must be controlled uniformly over the entire cell. (Assuming the precision of the distance between substrates as 10% or less, and assuming the distance between substrates as 1 $\mu$m, the precision is in the range of ±0.1 $\mu$m.)

Accordingly, in the above ferroelectric liquid crystal device, spacers such as glass beads or silica beads are used in a larger amount than in the conventional TN liquid crystal devices. This has caused a problem that the color filter in the ferroelectric liquid crystal cell can be damaged by the beady spacers.

On the other hand, known color filters include those disclosed in Japanese Laid-open Patent Publications No. 46325/1983, No. 78401/1985, No. 184202/1985, No. 184203/1985, No. 184204/1985, No. 184205/1985, No. 134807/1980, No. 16407/1982, No. 16408/1982, No. 74707/1982, No. 129707/1985, etc. The problems mentioned above could not be solved even by use of these color filters.

SUMMARY OF THE INVENTION

An object of the present invention is to provide a color filter having solved the above problems, and also to provide a liquid crystal device, particularly a ferroelectric liquid crystal device, employing such a color filter.

Particularly, an object of the present invention is to provide a color filter that may not be damaged even by the beady hard spacers such as glass beads and silica beads, and also provide a ferroelectric liquid crystal device employing such a color filter.

According to an aspect of the present invention, there is provided a liquid crystal device comprising a liquid crystal provided between a pair of substrates having transparent electrodes formed thereon, and a color filter provided on at least one of said substrates, wherein said color filter comprises a film formed from a polyamino resin containing a coloring material.

According to another aspect of the present invention, there is provided a color filter which is obtained by forming into a film a coating solution containing a polyamino resin having a photosensitive group bonded in its molecule and a coloring material.

DESCRIPTION OF THE PREFERRED EMBODIMENTS

The color filter of the present invention is characterized by comprising a patterned, color resin layer formed by photolithography of a color resin comprising a coloring material dispersed in a low temperature-curing polyamino resin containing in its molecule a group having a photosensitivity.

In other words, the color filter of the present invention is formed from a color resin layer using a resin and coloring material having good mechanical properties, and sufficient durability such as thermal resistance, light resistance and solvent resistance, therefore having properties of excellent reliability. It is also possible to readily design a color filter having desired spectral properties. Moreover, fine patterns are formed according to a simple method comprising only the photolithography generally practiced.

The low temperature-curing polyamino resin containing in its molecule a group having a photosensitivity, which forms the color resin layer constituting the color filter (hereinafter called "photosensitive polyamino resin") may include a resin capable of forming a cured film at 200° C. or lower, for example, an aromatic polyamide or polyimide resin having in its molecule a photosensitive group and capable of forming a cured film at a temperature, for example, of 150° C. in about 30 minutes. Particularly preferred is the resin not having particular light absorption characteristics (about 90% or more in light transmittance) in the visible light wavelength region (400 to 700 nm). From this viewpoint, the aromatic polyamide resin is particularly preferred.

The group having a photosensitivity mentioned in this invention may include an aromatic chain having a photosensitive unsaturated hyrocarbon group as shown, for example, in the following:

(1) Benzoic esters:

(In the formula, $R_1$ represents $CHX=CY-COO-Z-$, wherein X represents $-H$ or $-C_6H_5$, Y represents $-H$ or $-CH_3$, and Z represents —, an ethyl group or a glycidyl group.)

(2) Benzyl acrylates

(In the formula, Y represents $-H$ or $-CH_3$.)

(3) Diphenyl ethers

(In the formula, $R_2$ represents a group containing at least one of $CHX=CY-CONH-$, $CH_2=CY-COO-(CH_2)_2-OCO-$ and $CH_2=CY-COO-CH_2-$; and X and Y are as defined above.)

(4) Chalcones and other compounds (In the formula, $R_3$ represents $-H$, an alkyl group or an alkoxy group)

Examples of the aromatic polyamide resins and polyimide resins having these groups in their molecules may include Lithocoat PA-1000 (produced by Ube Industries, Ltd.), Lithocoat PI-400 (produced by Ube Industries, Ltd.), etc.

Generally speaking, photosensitive resins used in photolithography may vary in properties depending on chemical structure thereof, but few of them are excellent mechanical properties as well as durability such as thermal resistance, light resistance and solvent resistance. Contrary thereto, the photosensitive polyamino resin of the present invention pertains to a type of resins excellent in such durability in view of their chemical structure, whereby the durability of the color filter formed by using these is satisfactory.

The coloring material for forming the color resin layer constituting the color filter of the present invention may be any of organic pigments, inorganic pigments, dyes and so forth that can obtain desired spectral properties, without any particular limitation. Each material can be used alone, or can be used in the form of a mixture of some of these. Although, when dyes are used, the performances of a color filter may be governed by durability inherent in the dyes themselves, a product having better performances than conventional dyed color filters can be formed by using the resins of the present invention. Accordingly, the most preferred as the coloring material are the organic pigments when viewed from a color performance and other performances of the color filter.

As the organic pigments, there may be used azo pigments of a soluble azo type, an insoluble azo type, a condensed azo type, etc., as well as phthalocyanine type pigments, and also indigo type, anthraquinone type, perylene type, perynone type, dioxazine type, quinacridone type, isoindolinone type, phthalone type, methine type or azomethine type pigments, and other condensed polycyclic pigments including metal complex type ones; or a mixture of some of these.

In the present invention, the color resin used for the formation of the color resin layer may be prepared by incorporating the above coloring material having desired spectral properties into a solution of the above photosensitive polyamino resin in the proportion of about 10 to 50%, and sufficiently dispersing it by means of an ultrasonic wave or a three-roll mixer, followed by removing products of large grain size through a filter.

The color resin layer constituting the color filter of the present invention can be formed in a pattern by application of the above color resin onto a substrate with use of a coating means such as a spinner and a roll coater and according to photolithography. The layer thickness is determined depending on the desired spectral properties, but may usually range from about 0.5 to 5 μm, preferably from about 1 to 2 μm.

The color resin layer constituting the color filter of the present invention is constituted of a desirable material having itself sufficient durability, but, in order to protect the color resin layer from environmental conditions, an organic resin layer comprising polyamide, polyimide, polyurethane, polycarbonate or silicone, or an inorganic layer comprising $Si_3N_4$, $SiO_2$, $SiO$, $Al_2O_3$ or $Ta_2O_3$ may be provided on the surface of the color resin layer as a protective layer according to a coating method such as spin coating and roll coating or a vapor deposition method. Having been formed such a protective layer, some materials may be subjected to orientation treatment so as to be made applicable in a device employing a liquid crystal.

The color filter having the color resin layer as described above can be formed on a suitable substrate, which may include, for example, glass plates, transparent resin plates, resin films, cathode ray display faces, light-receiving faces of image pick-up tubes, wafers on which solid image pick-up devices such as CCD, BBD, CID and BASIS are formed, close contact type image sensors using thin film semiconductors, liquid crystal display faces, photosensitive members for color electrophotography, etc.

When further increase of the adhesion is necessary between the color resin layer and the underlying substrate, a silane coupling agent or the like may be thinly applied on the substrate and thereafter the patterns of the color resin may be formed, or, alternatively, a silane coupling agent or the like may be previously added in a small amount in the color resin and then a color filter may be formed by using it, more effectively.

A process for the formation of a typical example of the color filter of the present invention will be described below with reference to the drawings.

Figure 1A:
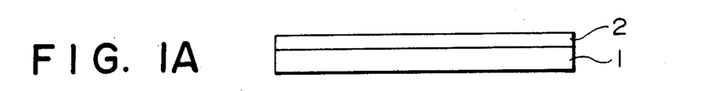
FIGS. 1A to 1F show a flow sheet to explain a process for formation of the color filter of the present invention.
Figure 1B:
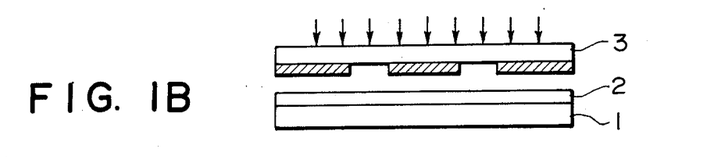

FIGS. 1A to 1F show a flow sheet to explain a process for the formation of the color filter of the present invention. As shown first in FIG. 1A, using a solution of polyamino resin (an NMP solution) incorporated with a predetermined amount of a coloring material having desired spectral properties, a color resin layer 2 as a first color is formed by coating on a given substrate 1 with use of a spinner to have a given film thickness, and prebaking is carried out under a suitable temperature condition. Subsequently, as shown in FIG. 1B, the color resin layer is exposed to light to which the photosensitive color resin is sensitive (for example, light from a high pressure mercury lamp), with the interposition of a photomask 3 having a form of given patterns corresponding to the patterns to be formed, to carry out photocuring of the patterned portion.

Figure 1C:
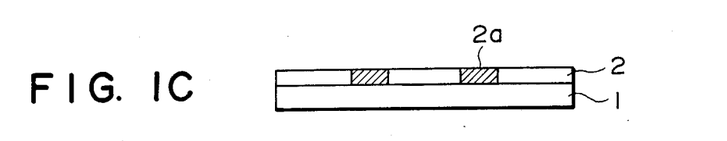
Figure 1D:
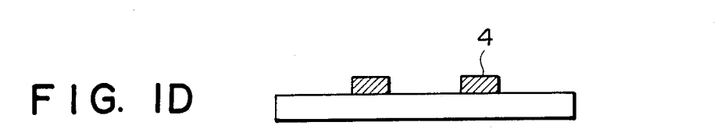

The color resin layer 2 having a photo-set portion 2a as shown in FIG. 1C is then subjected to ultrasonic development using a solvent capable of dissolving only an unexposed portion (for example, a solvent chiefly comprised of an N-methyl-2-pyrrolidone type solvent), followed by rinsing (for example, with 1,1,1-trichloroethane). Subsequently, post-baking is carried out to obtain a patterned color resin layer 4 of the present invention as shown in FIG. 1D.

Figure 1E:
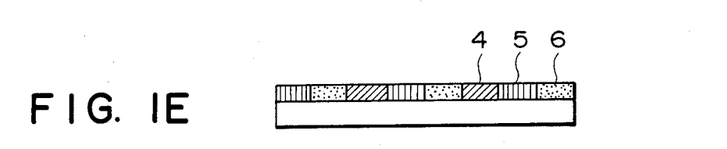

To form color filters of the present invention comprising two or more colors, the steps of from FIG. 1A to FIG. 1D may be repeated as desired, corresponding to the number of colors for the filters to be used and by using color resin solutions obtained by dispersing coloring materials corresponding to the respective colors, to form color filters comprising three colors corresponding to patterned color resin layers 4, 5 and 6 having different color as shown in FIG. 1E.

Figure 1F:
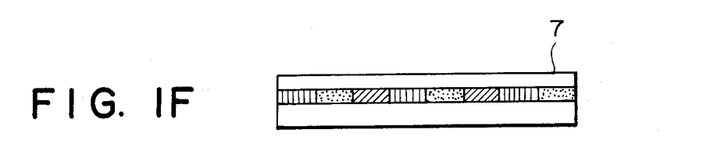

The color filter of the present invention may also have a protective layer as shown in FIG. 1F, formed on the upper surface of the filter and made of the material as mentioned above.

Figure 7:
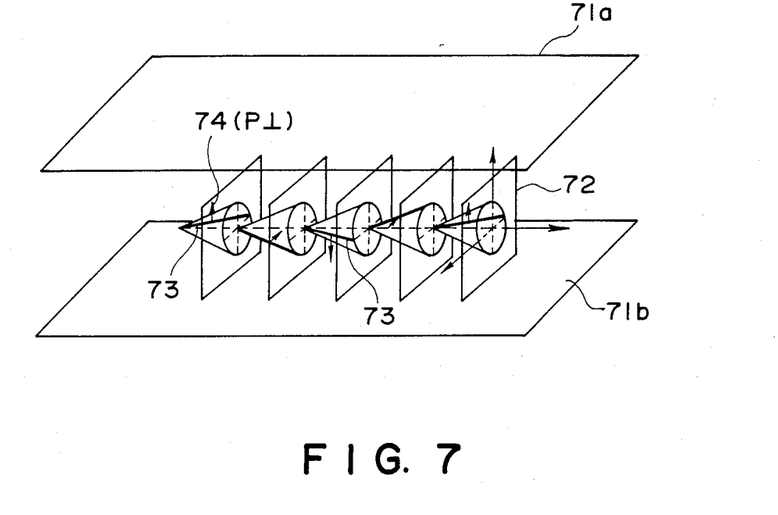
FIG. 7 and FIG. 8 are perspective views schematically showing a ferroelectric liquid crystal used in the present invention.

FIG. 7 schematically illustrates an example of a cell to explain the operation of a ferroelectric liquid crystal. Numerals 71a and 71b designate substrates (glass plates) covered with transparent electrodes comprising thin films made of $In_2O_3$, $SnO_2$ or ITO (indium-tin-oxide), between which a liquid crystal of SmC* or SmH* phase comprising a plurality of liquid crystal molecular layers 72 oriented in the manner perpendicular to the glass plates is sealed. Thick solid lines 73 represents liquid crystal molecules, which liquid crystal molecules 73 each have dipole moment ($P_\perp$) 74 vertically crossing its molecule. Once a voltage higher than a certain threshold value is applied to the electrodes on the substrates 71a and 71b, the spiral structure of the liquid crystal molecules 73 is unwound, and thus the orientation of the liquid molecules 73 can be changed so that all the dipole moment ($P_\perp$) 74 may be oriented toward the electric field. The liquid crystal molecules 73 have a long and narrow shape, showing refractive index anisotropy in their major axis direction and minor axis direction. Accordingly, it is readily seen that polarizers arranged at the upper side and lower side of the substrate plate in mutually crossed nicol relationshp may serve as liquid crystal optical modulation devices that can change optical properties according to the polarity of voltage application.

Figure 8:
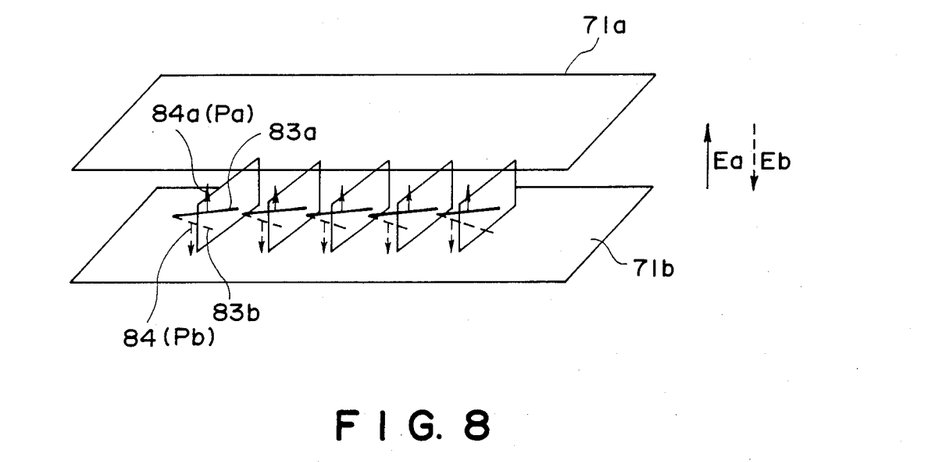

The crystal cell preferably used in the ferroelectric liquid crystal device of the present invention can be made sufficiently thin in its thickness (for example, 10 $\mu$m or less). With lessened thickness of a liquid crystal phase like this, the spiral structure of liquid crystal molecules can be unwound to give non-spiral structure as shown in FIG. 8 even in the state where no electric field is applied, whereby the dipole moment Pa or Pb can be either upward directed (84a) or downward directed (85a). Applying to such a cell an electric field Ea or Eb larger than a certain threshold value and having different polarity as shown in FIG. 8, the dipole moment can be changed in its direction, i.e., upward direction 84a or downward direction 84b corresponding to the electric field vector of the electric field Ea or Eb, and, corresponding thereto, the crystal molecules can be oriented toward either one of a first stable state 83a or a second stable state 83b.

There are two advantages, as mentioned above, in using such a ferroelectric liquid crystal as the optical modulation device. The first is that the response is very speedy, and the second is that the orientation of liquid crystal molecules is bistable (or exhibits a memory effect). Explaining the second advantage in greater detail based on FIG. 8, the liquid crystal molecules are oriented toward the first stable state 83a when an electric field Ea is applied, and this state is kept stable even if the electric field is taken away. When a reverse electric field Eb is applied, the liquid crystal molecules are oriented toward the second stable state 83b to change its direction, and still remain in this state even if the electric field is taken away. The respective states of the orientation are also still maintained so long as the electric field Ea applied does not exceed a certain threshold value. In order to effectively achieve such speedy response and bistableness, the cell is preferably as thin as possible.

In order for such ferroelectric liquid crystal device to exhibit predetermined driving performances, the ferroelectric liquid crystal arranged between a pair of parallel substrates is required to be in such a state of molecule arrangement that the conversion between the above two stable states may effectively occur. For example, in a ferroelectric liquid crystal having a chiral smectic phase, liquid crystal molecule layers of the chiral smectic phase are perpendicular to the substrate face, and therefore a region (a mono-domain) in which liquid crystal axes are arranged substantially parallel to the substrate face is required to be formed.

Figure 6:
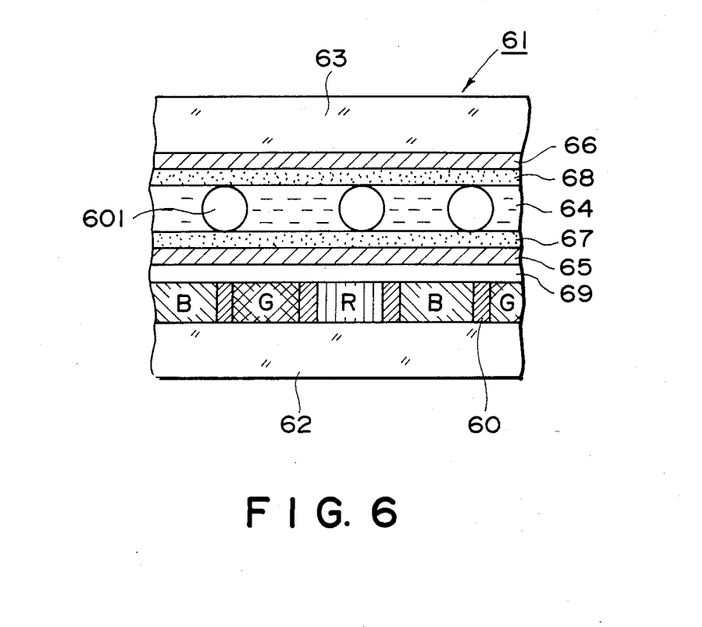
FIG. 6 is a cross-section showing basic constitution of a ferroelectric liquid crystal device according to the present invention.

FIG. 6 is a cross-section showing basic constitution of the ferroelectric liquid crystal device according to the present invention. In FIG. 6, a ferroelectric liquid crystal device 61 comprises substrates 62 and 63 made of transparent plates such as glass plates and plastic plates, between which a ferroelectric liquid crystal 64 is interposed. The respective substrates 62 and 63 are provided with stripe-patterned transparent electrodes 65 and 66 to form a matrix electrode structure, which electrodes function as a scanning electrode and a signal electrode. On these transparent electrodes, orientation-controlling films 67 and 68 are formed. Color filters for R (red), G (green) and B (blue) are respectively formed by previously determining density of coloring materials so as to have a uniform layer thickness and desired spectral properties. On the other hand, if necessary, a light-intercepting layer 60 may be formed at the gaps between the respective color filters, and also a protective layer or a flattening layer 69 may be further formed thereon.

In the substrates constructed as above, the level difference that may occur by color filters and gaps between picture elements are corrected, so that the substrate faces can be kept substantially flat even if the transparent electrodes and the orientation-controlling films are successively formed.

In the present invention, as the faces are flattened as described above, the level difference of color filter substrate can be made to be 1000 Å or less, but preferably should be made to be 500 Å or less. The level difference not more than 1000 Å will not cause any orientation defects in lines that have occurred in liquid crystal devices using non-flattened layers formed under the level difference of 1000 Å or more, particularly 1200 Å or more.

Spacers 601 used in the present invention may include glass beads and silica beads, and, besides these, plastic beads, glass fiber, etc. may be used. Since the average particle size of the spacers 601 is meaningful for controlling the distance between the pair of substrates, it is preferable to use spacers having particle size distribution as small as possible. Density of distribution of the spacers 601 may be 1 to 100 particles, preferably about 5 to 50 particles, per 1 mm$^2$.

In the present invention, the above color filter has sufficient hardness against the spacers 601 in the cell, and, presumably to this reason, no damage is caused on the color filter.

Generally speaking, photosensitive resins used in photolithography may be different in properties depending on chemical structure thereof, but few of them are excellent in mechanical properties as well as durability such as thermal resistance, light resistance and solvent resistance. Contrary thereto, the photosensitive polyamino resin of the present invention pertains to a type of resins excellent in such durability in view of their chemical structure also, whereby the durability of the color filter formed by using these can be made very good. It particularly can exhibit excellent performances for the thermal resistance in spatter formation of transparent conductive layers, and against damages of the color filter due to the spacers 601 in constructing a liquid crystal device, which are tend to be questioned as a color filter for a ferroelectric liquid crystal device.

The color filter of the present invention is made of a desirable material having itself sufficient durability, but, in order to protect the color filter from environmental conditions, an organic resin layer comprising polyamide, polyimide, polyurethane, polycarbonate or silicone, or an inorganic layer comprising $Si_3N_4$, $SiO_2$, $SiO$, $Al_2O_3$ or $Ta_2O_3$ may be provided on the surface of the color filter as the protective layer 69 or flattening layer 69 according to a coating method such as spin coating and roll coating or a vapor deposition method. Also, the thickness of the protective layer 69 may vary depending on the type of liquid crystal materials or the required speed of response, but may be generally set in the range of 0.2 $\mu$m to 20 $\mu$m, preferably 0.5 $\mu$m to 10 $\mu$m.

In order to improve display performaces, a light-intercepting layer can be provided according to any one of the three methods shown below:

(1) A method in which a light-intercepting resin obtained by dispersing a light-intercepting material such as carbon black, iron black, graphite, composite oxide black pigments of copper-chromium system or copper-iron-manganese system, or other metallic powder having a light-intercepting ability, in a photosensitive polyamino resin of the same type as in forming the above color filter, is used to form light-intercepting patterns on any of the glass substrate 62, the color filter patterns, the protective layer 69 or the flattening layer 69, according to the photolithography so as to be fitted to the gaps between the respective picture elements.

(2) A method in which a metallic thin film comprising chromium, aluminum or the like, having a light-intercepting ability, is formed on any of the glass substrate 62, the color filter patterns, the protective layer 69 and the flattening layer 69, according to vapor deposition or spattering to form a resist mask fitted to the gaps between the respective picture elements, followed by etching of the metallic thin film on the respective picture elements to form light-intercepting patterns.

(3) In forming color filter patterns on the glass substrate 62, light-intercepting patterns are simultaneously formed by overlapping edge portions (about 2 to 15 $\mu$m) of two colors adjacent in the color filter patterns, and the above protective layer 69 or the flattening layer 69 is provided on the color filter layer to flatten the overlapped portion.

The thickness of the light-intercepting layer for the above respective light-intercepting patterns may be set in the manner that the faces which form transparent electrodes may be substantially flattened.

The orientation-controlling films 67 used in the present invention can be formed by selecting a material including, for example, resins such as polyvinyl alcohol, polyimide, polyamide-imide, polyester, polycarbonate, polyvinyl acetal, polyvinyl chloride, polyvinyl acetate, polyamide, polystyrene, cellulose resin, melamine resin, urea resin and acrylic resin; or photosensitive polyimide, photosensitive polyamide, cyclic rubber type photoresist, phenol novolac type photoresist and electron ray photoresist (such as polymethyl methacrylate and epoxydated-1,4-polybutadiene). Thickness of the orientation-controlling films 67, though depending on the film thickness of the ferroelectric liquid crystal, may be set to be generally in the range of 10 Å to 1 $\mu$m, preferably 100 Å to 3000 Å. To this orientation-controlling films 67, an uniaxially orienting axis is preferably imparted by rubbing treatment.

Particularly preferable liquid crystal materials used in the present invention are liquid crystals which are bistable and also ferroelectric. Specifically, liquid crystals of chiral smectic C phase (SmC*), H phase (SmH*), I phase (SmI*), J phase (SmJ*), K phase (SmK*), G phase (SmG*) or F phase (SmF*) can be used.

The ferroelectric liquid crystals are disclosed in "LE JOURNAL DE PHYSIQUE LETTERS" 1975, No. 36 (L-69), 'Ferroelectric Liquid Crystals'; "Applied Physics Letters" 1980, No. 36 (11), 'Submicro Second Bistable Electrooptic Switching in Liquid crystals'; "Solid Physics" 1981, No. 16 (141), 'Liquid Crystals'; etc. The ferroelectric liquid crystals disclosed in these publications can be used in the present invention.

Specific examples of the ferroelectric liquid crystlas may include, for example, decyloxybenzylidene-P'-amino-2-methylbutylcinnamate (DOBAMBC), hexyloxybenzylidene-p'-amino-2-chloropropylcinnamate (HOBACPC) and 4-o-(2-methyl)-butylresorcylidene-4'-octylaniline (MBRAS).

In constructing a device with use of these materials, the device can be optionally supported by a block or the like comprising a heater embedded thereinto to retain the liquid crystal compound in such a temperature state that it may have a chiral smectic phase.

In the ferroelectric liquid crystal device of the present invention, color filters for the respective picture elements are formed to have substantially the same film thickness; transparent electrodes and orientation-controlling films are laminated on said color filters, without any level difference in the face brought into contact with the liquid crystal phase to make better the flatness of substrates. Between the flat substrate, in a temperature-lowering process for causing transition from an isotropic phase to a liquid crystal phase, the liquid crystal region grows gradually during gradual cooling to form a uniform mono-domain of the liquid crystal.

For example, taking as a liquid crystal an example of the above DOBAMBC showing the ferroelectric liquid crystal phase, DOBAMBC in an isotropic phase undergoes phase transition to smectic A phase (SmA phase) at about 115° C. in the course of gradual cooling. At this time, by applying to a substrate an orientation treatment such as rubbing and $SiO_2$ oblique vapor deposition, formed is a mono-domain in which molecular axes of liquid crystal molecules are oriented parallel to the substrate and in a given direction. By further proceeding with cooling, the phase transition to a chiral smectic C phase (SmC* phase) occurs at a particular temperature of from about 90° to 75° C. which depends on the thickness of a liquid crystal layer. Also, by reducing the thickness of the liquid crystal layer to about 2 μm or less, spiral SmC* phase is unwound, whereby the liquid crystal becomes bistable.

Examples of the present invention are set out below:

Example 1

A blue color resin material [a photosensitive color resin material 93 produced by dispersing Heliogen Blue L7080 (trade name; produced by BASF; C.I. No. 74160) in PA-1000 (trade name; produced by Ube Industries, Ltd.; polymer content: 10%; solvent: N-methyl-2-pyrrolidone; pigment/polymer=1:2)] capable of obtaining desired spectral properties was applied on a glass substrate by spinner coating to have a layer thickness of 2.0 μm. Subsequently, the color resin layer thus formed was prebaked at 80° C. for 30 minutes, and thereafter exposed using a high pressure mercury lamp, with the interposition of a pattern mask corresponding to a form of patterns to be formed. After exposure was completed, development using ultrasonic waves was carried out with use of a developer (a developer chiefly composed of N-methyl-2-pyrrolidone) exclusively used for dissolving only the unexposed portion of the color resin-layer, and treated with an exclusive rinsing solution (a rinsing solution chiefly composed of 1,1,1-trichloroethane), followed by post-baking at 150° C. for 30 minutes to form a blue color resin layer having a pattern form.

Next, green color patterns were formed on predetermined positions of the glass substrate on which the blue color patterns were formed, in the same manner as above except that a green color resin material [a photosensitive color resin material 93 produced by dispersing Lionol Green 6YK (trade name; produced by Toyo Ink Mfg. Co., Ltd.; C.I. No. 74265) in PA-1000 (trade name; produced by Ube Industries, Ltd.; polymer content: 10%; solvent: N-methyl-2-pyrrolidone; pigment/polymer=1:2)] was used as a second color.

Red color patterns were further formed on predetermined positions of the glass substrate on which the blue color and green color patterns were thus formed, in the same manner as above except that a red color resin material [a photosensitive color resin material 93 produced by dispersing a red color resin material Irgazin Red BPT (trade name; produced by Ciba-Geigy Corp.; C.I. No. 71127) in PA-1000 (trade name; produced by Ube Industries, Ltd.; polymer content: 10%; solvent: N-methyl-2-pyrrolidone; pigment/polymer=1:2)] was used as a third color, thus obtaining color patterns comprising three primary color strips of R (red), G (green) and B (blue).

Figure 2:
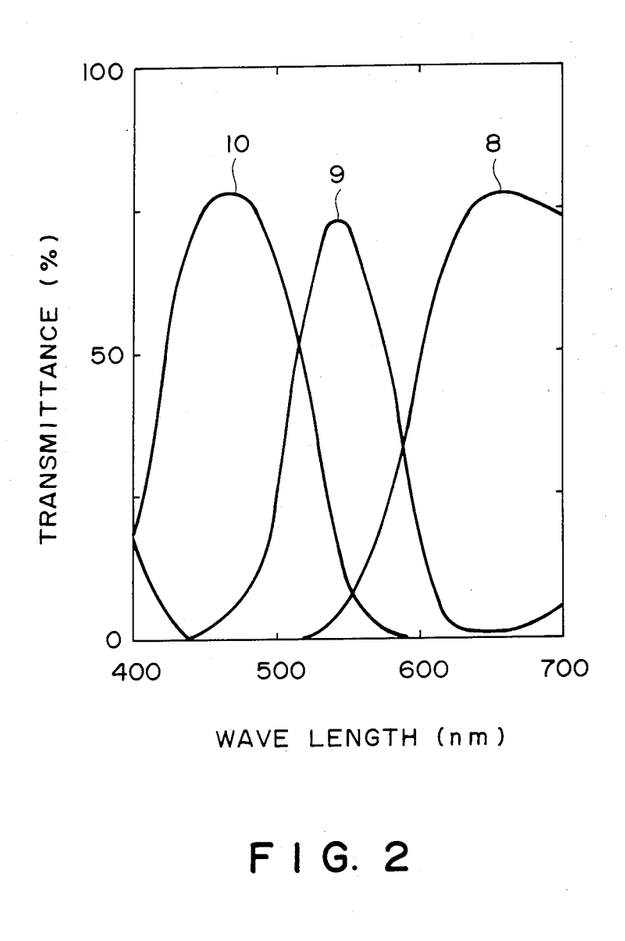
FIG. 2 is a graph showing the spectral transmission factor of a color resin layer constituted in the color filter of Example of the present invention.

Spectral properties of the color filters of three primary colors thus formed are shown in FIG. 2, in which curves 8, 9 and 10 concern with the red, green, and blue color resin layer, respectively.

The color filters obtained have excellent thermal resistance and are durable to a temperature of 250° C., whereby it becomes possible to form ITO on CF by spattering.

The color filters obtained have also high hardness and excellent mechanical properties, and therefore, even when CF was constituted in a liquid crystal cell in contact with spacers, the CF may not be destroyed at press-adhesion. They also have excellent solvent resistance, and are durable to solvents after curing, free from any change in the production processes, and also have excellent light resistance.

Comparative Example 1

Example 1 was repeated except that non-photosensitive color polyamide resin was used in place of the photosensitive color polyamide resin to form color filters of three primary colors.

More specifically, a blue color polyimide resin material [a color resin material produced by dispersing Heliogen Blue L7080 (trade name; produced by BASF; C.I. No. 74160) in Semicofine SP-780 (trade name; produced by Toray Industries Inc.; solid content: 17.5%; pigment/polymer=1:2)] was applied on a glass substrate by spinner coating to give a layer thickness of 2.0 μm. Next, this color resin layer was dried at 150° C. for 30 minutes, followed by heating at 200° C. for 30 minutes. Thereafter, a positive type resist, OFPR-2 (trade name; produced by Tokyo Ouka Co.), was applied by a spinner on said blue layer, and the layer thus formed was prebaked at 80° C. for 20 minutes, and thereafter exposed using a high pressure mercury lamp, with the interposition of a pattern mask corresponding to a form of patterns to be formed. After exposure was completed, the resist was developed by an alkaline developer and also the blue layer was etched, and subsequently the resist was peeled off by use of acetone, followed by baking at 250° C. for 30 minutes, thereby forming a blue color resin layer having a pattern form.

Next, green color patterns were formed on predetermined positions of the glass substrate on which the blue color patterns had been formed, in the same manner as above except that a green color polyimide resin material [a color resin material produced by dispersing Lionol Green 6YK (trade name; produced by Toyo Ink Mfg. Co., Ltd.; C.I. No. 74265) in Semicofine SP-780 (trade name; produced by Toray Industries Inc.; solid content: 17.5%; pigment/polymer=1:2)] was used as a second color.

Red color patterns were further formed on predetermined positions of the glass substrate on which the blue color and green color patterns had been thus formed, in the same manner as above except that a red color polyimide resin material [a color resin material produced by dispersing Irgazin Red BPT (trade name; produced by Ciba-Geigy Corp.; C.I. No. 71127) in Semicofine SP-780 (trade name; produced by Toray Industries Inc.; solid content: 17.5%; pigment/polymer=1:2)] was used as a third color, thus obtaining color patterns comprising three primary color stripes of R (red), G (green) and B (blue).

The color filters of three primary colors thus formed required resist processes for patterning, for each step of the respective color formation, and thus the process was very cumbersome and had poor productivity, as compared with the production process of the present invention.

Moreover, as compared with the polyamide resin of the present invention having good transparency, there resulted in a color performance such that the blue color patterns were turbid because of yellowish color inherent in the polyimide resin itself.

Example 2

Using a thin-film transistor as a substrate, a liquid crystal color display device comprising color filters of the present invention formed on said substrate was produced in the following manner.

Figure 3A:
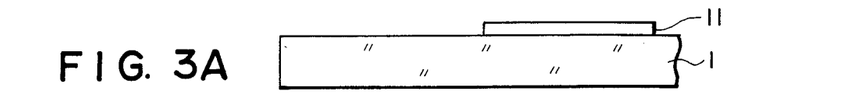
FIGS. 3A to 3H show a flow sheet for production of a liquid crystal color display device having a color filter of the present invention.
Figure 3B:
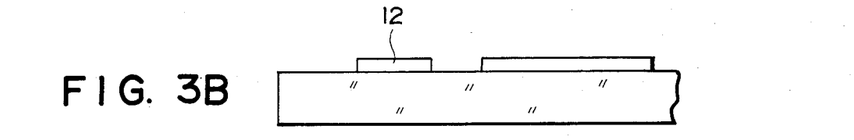

As shown in FIG. 3A, an I.T.O. picture element electrode 11 having a layer thickness of 1000 Å was first formed on a glass substrate 1 (trade name: 7509; produced by Corning Glass Works) according to photolithography to have a desired pattern, and, thereafter, Al was further vacuum-deposited on this face to have a layer thickness of 1000 Å, followed by patterning of this vapor-deposited layer according to photolithography to provide a desired form, thereby forming a gate electrode 12 as shown in FIG. 3B.

Figure 3C:
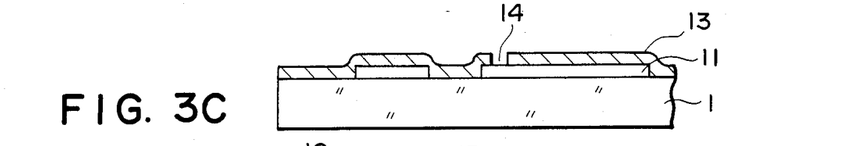

Subsequently, a photosensitive polyimide (trade name: Semicofine; produced by Toray Industries, Inc.) was applied on the surface of the substrate 1 provided with the above electrode to form an insulating layer 13, and a through-hole 13 constituting a contact area between a drain electrode 18 and the picture element electrode was formed as shown in FIG. 3C according to pattern exposure and developing.

Figure 3D:
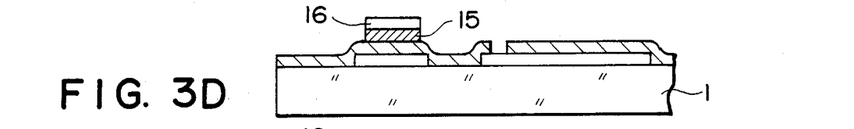
Figure 3E:
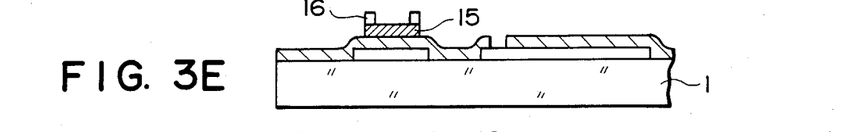

Here, the substrate 1 was set at a predetermined position in a deposition chamber, and SiH$_4$ diluted with H$_2$ was introduced in the deposition chamber. On the whole surface of the substrate 1 provided with the above electrodes 11 and 12 and the insulating layer 13, a photoconductive layer (an intrinsic layer) 15 comprising a-Si having a layer thickness of 2000 Å was deposited according to glow discharging in vacuo, and thereafter an n+ layer 16 having a layer thickness of 1000 Å was successively laminated on this photoconductive layer 15 as shown in FIG. 3D following the same procedures. This substrate 1 was taken out of the deposition chamber, and each of the above n+ layer 16 and the photoconductive layer 15 in this order was patterned as shown in FIG. 3E according to dry etching to give a desired form.

Figure 3F:
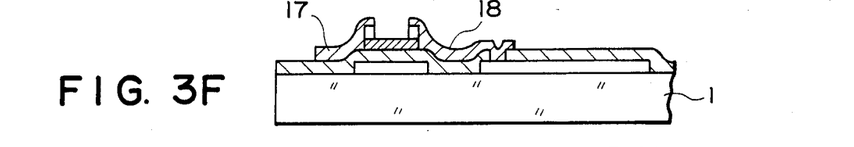

Next, on the substrate provided in this manner with the photoconductive layer 15 and n+ layer 16, Al was vacuum-deposited to have a layer thickness of 1000 Å, and thereafter this Al-deposited layer was patterned according to photolithography to have a desired form, thereby forming a source electrode 17 and a drain electrode 18 as shown in FIG. 3F.

Figure 3G:
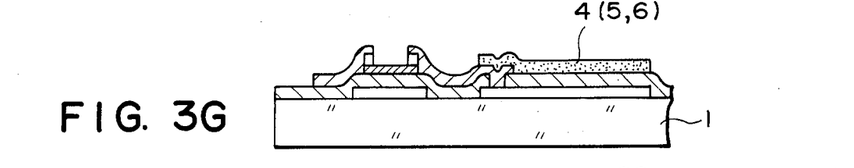
Figure 3H:
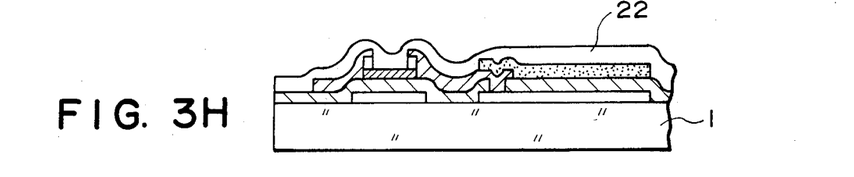

Finally, corresponding to each picture element electrode 11, procedures in Example 1 were followed to form color patterns comprising three primary colors of red, blue and green as shown in FIG. 3G, and thereafter, as shown in FIG. 3H, on the whole surface of this substrate, a polyimide resin serving as an insulating layer 22 endowed with an orientation function was applied to have a layer thickness of 1200 Å, followed by curing of the resin by heating at 250° C. for 1 hour to produce a thin-film transistor in which the color filters are integrally embedded.

Using the color filter-embedded thin-film transistor thus produced, a liquid crystal color display device was formed.

Specifically speaking, an I.T.O. electrode layer of 1000 Å was formed on one face of a glass substrate (trade name: 7059; produced by Corning Glass Works) in the same manner as described above, and, on said electrode layer, further formed was an insulating layer having a layer thickness of 1200 Å and comprising a polyimide resin endowed with an orientation function. Between this substrate and the color filter-embedded thin-film transistor previously formed, a liquid crystal was sealed and the whole body was fixed to obtain a liquid crystal color display device.

The liquid crystal color display device thus formed was found to have favorable functions.

Example 3

Example 2 was repeated except that the color filters of three primary colors were provided on a counter electrode in place of being provided on the picture element electrode, to obtain a liquid crystal color display device having the color filters of the present invention.

The liquid crystal color display device thus formed was found to have favorable functions.

Example 4

Example 2 was repeated except that the color filters of three primary colors were first formed on the counter substrate and thereafter the counter electrode was provided, to obtain a liquid crystal color display device having the color filters of the present invention.

The liquid crystal color display device thus formed was found to have favorable functions.

Comparative Example 2

Color filters of the three primary colors having the constitution as in Example 4 were formed following Example 1 except that a polyvinyl alcohol resin containing ammonium dichromate as a crosslinking agent was used in place of the photosensitive color polyamide resin.

More specifically, the blue color material having photosensitivity was applied by using a spinner. The coating thus formed was dried at 90° C. for 10 minutes, and thereafter exposed and developed according to a conventional method, followed by heating at 150° C.

for 30 minutes to form a blue color resin film having a pattern form.

Subsequently, following the same procedures, green color patterns and red color patterns were formed at predetermined positions to obtain patterns comprising three primary color stripes of R (red), G (green) and B (blue).

On the color filters of three primary colors thus formed, a transparent conductive film was tried to be formed by spattering, but the color resin had so poor thermal resistance that it suffered color change and fading.

Example 5

Example 1 was repeated except that a wafer on which a CCD (charged-coupled device) was formed was used as the substrate and the color filters of three primary color stripes were formed in the manner that the respective color patterns of the color filters may be arranged corresponding to the respective receptor cells of the CCD, to form a color solid image pick-up device having the color filters of the present invention.

The color solid image pick-up device thus formed was found to have favorable functions.

Example 6

On a wafer on which a CCD (charged-coupled device) was formed, the color filters formed in example 1 were adhered by making alignment in the manner that the respective color patterns of the color filters may be arranged corresponding to the respective receptor cells of the CCD, to form a color solid image pick-up device The color solid image pick-up device thus formed was found to have favorable functions.

Example 7

A color photosensor array as shown in a schematic partial plan view of FIG. 4, having the color filters of the present invention, was formed in the following manner according to the process shown in FIG. 5.

Figure 5A:
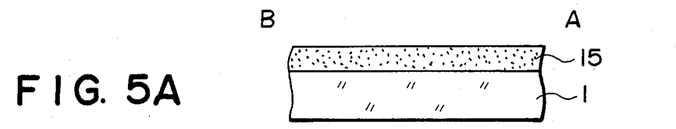
FIGS. 5A to 5G show a flow sheet for formation of a color photosensor array having a color filter of the present invention.

First, on a glass substrate (trade name: 7059; produced by Corning Glass Works), a photoconductive layer (an intrinsic layer) 15 comprising a-Si (amorphous silicon) layer was provided as shown in FIG. 5A according to glow discharging.

More specifically, $SiH_4$ diluted with $H_2$ to 10% by volume was deposited on the substrate under gas pressure of 0.50 Torr, RF (radio frequency) power of 10 W and at substrate temperature of 250° C. for 2 hours to obtain a photoconductive layer 15 having a layer thickness of 0.7 μm.

Figure 5B:
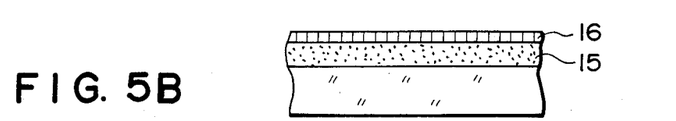

Subsequently, on this photoconductive layer 15, an $n^+$ layer 16 was provided as shown in FIG. 5B according to a glow discharge method.

More specifically, using as a starting material a gas comprising a 1:10 mixture of $SiH_4$ diluted with $H_2$ to 10% by volume and $PH_3$ diluted with $H_2$ to 100 ppm, other procedures same as those for the conditions for the deposition of the foregoing photoconductive layer were followed to provide the $n^+$ layer 16 having a layer thickness of 0.1 μm subsequent to the photoconductive layer 15.

Figure 5C:
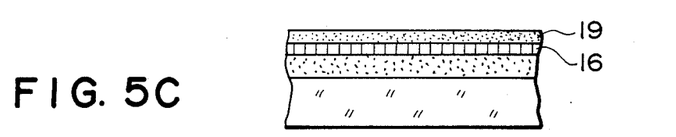
Figure 5D:
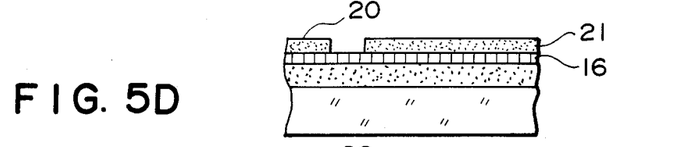

Next, as shown in FIG. 5C, a conductive layer 19 was provided by depositing Al on the $n^+$ layer 16 according to an electron beam deposition method to have a layer thickness of 0.3 μm. Subsequently, a portion corresponding to the portion of the conductive layer 19 at which optical transformation is effected was removed as shown in FIG. 5D.

More specifically, after photoresist patterns were formed by using a positive type photoresist Microposit 1300-27 (trade name; produced by Shipley Co.), the conductive layer 19 was removed at its exposed portions (the portions provided with no resist pattern) from the substrate by using an etchant comprising a 16:1:2:1 mixture of phosphoric acid (an 85 vol. % aqueous solution), nitric acid (a 60 vol. % aqueous solution), glacial acetic acid and water, thereby forming a common electrode 21 and a unit electrode 20.

Figure 5E:
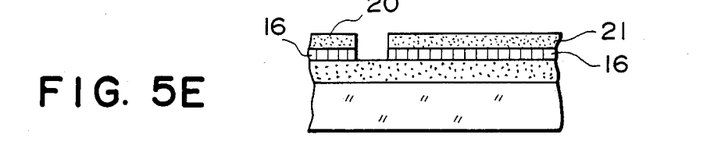

Next, a portion of the $n^+$ layer 16 at which optical transformation is effected was removed as shown in FIG. 5E.

More specifically, after the above photoresist Microposit 1300-27 was peeled from the substrate, dry etching using $CF_4$ gas was carried out for 5 minutes under RF power of 120 W and gas pressure of 0.1 Torr according to plasma etching (alternatively called reactive ion etching) using a parallel flat plate type plasma etching apparatus DEM-451 (produced by Nichiden Anelva Co.), to remove from the substrate the $n^+$ layer 16 at its exposed portions and a part of the surface layer of the photoconductive layer 15.

In the present Example, in order to prevent the implantation of a cathode material in the etching apparatus, a spattering target made of polysilicone (8 inches; purity: 99.999%) was placed on a cathode, on which a sample was placed, and portions at which SUS of the cathode material was exposed were covered with a Teflon sheet cut into a doughnut, so that the etching was carried out in such a state that the SUS face was scarcely exposed to plasma. Thereafter, heating was carried out at 20° C. for 60 minutes in an oven containing nitrogen flowing at a rate of 3 liter/min.

On the surface of the photosensor array thus produced, a protective layer was formed in the following manner:

A silicon nitride layer was formed as a protective layer 7 on the photosensor array.

Figure 5F:
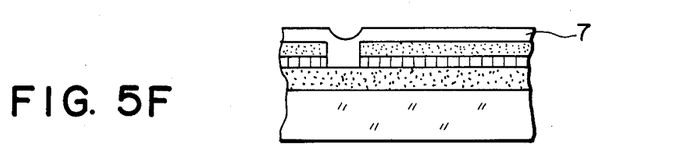
Figure 5G:
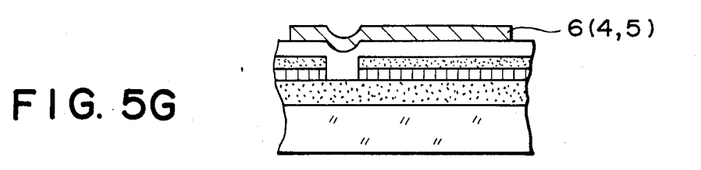

More specifically, using a mixed gas obtained by mixing $SiH_4$ diluted with $H_2$ to 10% by volume and 100% $NH_3$ at a flow ratio of 1:4, other procedures same as those for the formation of the foregoing a-Si layer were followed to form the protective layer 7 as shown in FIG. 5F, comprising a silicon nitride (a-SiNH) layer having a layer thickness of 0.5 μm.

Figure 4:
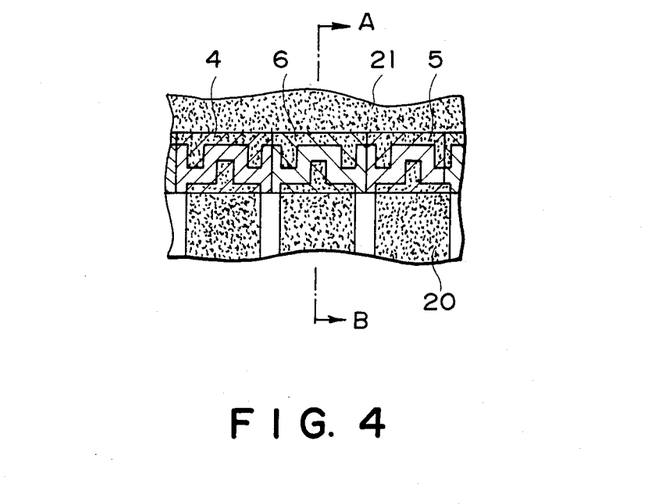
FIG. 4 shows a schematic partial plan view of a color photosensor array having a color filter of the present invention.

Using this protective layer 7 as a substrate further formed in the same manner as in Example 1 were color filters comprising color patterns of three primary colors of blue 5, green 4 and red 6, to form, as shown in FIG. 4, a color photosensor array provided respectively with the color filters on each photosensor.

The color photosensor array formed in the present Example was also found to have favorable functions.

EXAMPLE 8

The color filters formed in Example 1 were adhered on the photosensor array formed in Example 7 with use of an adhesive to form a color photosensor array.

The color photosensor array formed in the present Example was also found to have favorable function similar to the one formed in Example 7.

EXAMPLE 9

FIGS. 9A to 9F show a flow sheet illustrating steps for the formation of color picture elements comprising three primary colors R, G and B.

First, a blue color resin material [a photosensitive color resin material produced by dispersing Heliogen Blue L7080 (trade name; produced by BASF; C.I. No. 74160) in PA-1000C (trade name; produced by Ube Industries, Ltd.; polymer content: 10%; solvent: M-methyl-2-pyrrolidone; pigment/polymer=1:2)] capable of obtaining desired spectral properties was applied on a #7059 glass substrate 91 available from Corning Glass Works, by spinner coating to have a film thickness of 1.5 μm, thereby forming color resin layers 92. (See FIG. 9A)

Next, the color resin layers 92 thus formed were prebaked at 80° C. for 30 minutes, and thereafter exposed using a high pressure mercury lamp, with the interposition of a pattern mask corresponding to a form of patterns to be formed. (See FIG. 9B)

Figure 9A:
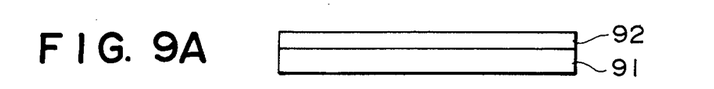
FIGS. 9A to 9F show a flow sheet illustrating steps for the formation of color picture elements in the present invention.
Figure 9B:
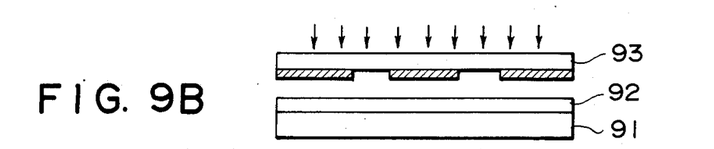
Figure 9C:
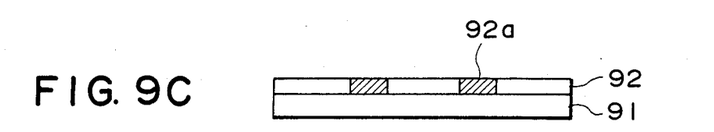

After exposure was completed, development using ultrasonic waves was carried out with use of a developer (a developer chiefly composed of N-methyl-2-pyrrolidone) exclusively used for dissolving only the unexposed portions of the color resin layers 92 having photo-cured portions 92a as shown in FIG. 9C, and treated with an exclusive rinsing solution (a rinsing solution chiefly composed of isopropyl alcohol), followed by post-baking at 150° C. for 30 minutes to form blue color resin layers 94 having a pattern form. (See FIG. 9D)

Figure 9D:
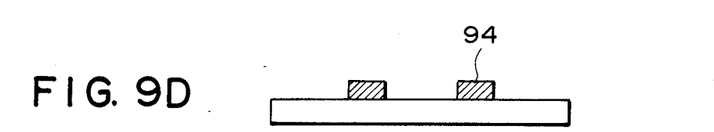
Figure 9E:
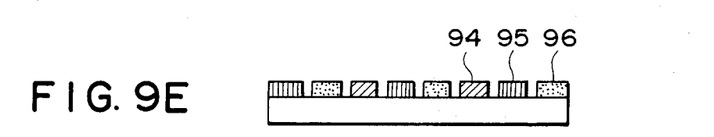
Figure 9F:
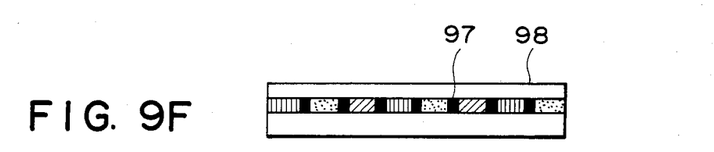

Subsequently, green color pattern-formed color resin layers 95 were formed on predetermined positions of the glass substrate on which the blue color patterns had been formed, in the same manner as above except that a green color resin material [a photosensitive color resin material 3 produced by dispersing Lionol Green 6YK (trade name; produced by Toyo Ink Mfg. Co., Ltd.; C. I. No. 74265) in PA-1000C (trade name; produced by Ube Industries, Ltd.; polymer content: 10%; solvent: N-methyl-2-pyrrolidone; pigment/polymer=1:2)] was used as a second color.

Red color pattern-formed color resin layers 96 were further formed on predetermined positions of the substrate on which the blue color and green color patterns had been thus formed, in the same manner as above expect that a red color resin material [a photosensitive color resin material 3 produced by dispersing Irgazin Red BPT (trade name; produced by Ciba-Geigy Corp.; C. I. No. 71127) in PA-1000C (trade name; produced by Ube Industries, Ltd.; polymer content: 10%; solvent: N-methyl-2-pyrrolidone; pigment/polymer=1:2 mixing)] was used as a third color, thus obtaining color patterns comprising three primary color stripes of R (red), G (green) and B (blue) (See FIG. 9E)

Next, using as a light-intercepting material a black color resin material [a photosensitive color resin material produced by dispersing carbon black (C. I. No. 77266) in PA-1000C (polymer content: 10%; pigment/polymer=1:4)], light-intercepting layers 97 having light-intercepting patterns were formed in the same manner as above on a glass substrate on which the color patterns of three primary colors were formed.

On the color filter patterns thus obtained, a transparent resin material [PA-1000C (trade name; produced by Ube Industries, Ltd.; polymer content: 10%; solvent: N-methyl-2-pyrrolidone)] similar to the material used in the color resin material was formed as a protective layer or flattening layer 98 according to spinner coating to have a film thickness of about 1.0 μm. (See FIG. 9F)

It was possible by the above procedures to form a color filter substrate uniformly flattened.

Subsequently, as shown in FIG. 6, ITO was formed into a film to have a thickness of 500 Å according to spattering to provide a transparent electrode 65. On this electrode, a polyimide-forming solution (PIQ available from Hitachi Chemical Co., Ltd.) was applied by using a spinner revolving at 3000 rpm, followed by heating at 150° C. for 30 minutes to form a polyimide film of 2000 Å as an orientation-controlling film 67. Thereafter, the surface of this polyimide coating was applied with rubbing treatment, and then silica beads having an average particle size of about 1.5 μm were spread over the color filter substrate in the proportion of about 50 particles per 1 mm².

The color filter substrate thus formed and a counter substrate 63 were combined to construct a cell, to which a ferroelectric liquid crystal "CS-1014" (trade name; produced by Chisso Corporation) was injected, followed by sealing to obtain a liquid crystal device. This liquid crystal device was observed by polarized microscope having crossed nicols to confirm that no orientation defect was caused in the internal liquid crystal molecules. Damages on color filters were also observed by an optical microscope to reveal that no damage was caused.

For comparison, Example 8 was repeated except that the color filter substrate produced in Comparative Example 2 was used, to produce a ferroelectric liquid crystal device, but microscopic observation clearly revealed that the color filters were damaged silica beads. From experiments made by the present inventors, it was also revealed that the color material melted out from the damaged portions of such a color filter into the liquid crystal, and volume resistance of the liquid crystal gradually decreased after use over long period of time to make it impossible to achieve multiplexing drive.

We claim:

1. A liquid crystal device comprising a liquid crystal provided between a pair of substrates each having a transparent electrode formed thereon, and a color filter provided on at least one of said substrates, said color filter comprising a film formed from a polyamino resin containing a coloring material dispersed therein.

2. The liquid crystal device according to claim 1, wherein said polyamino resin is a polyamide resin.

3. The liquid crystal device according to claim 2, wherein said polyamino resin is a polyimide resin.

4. The liquid crystal device according to claim 1, wherein said polyamino resin has a photosensitive group bonded in its molecule.

5. The liquid crystal device according to claim 4, wherein said photosensitive group is represented by Formula (1) shown below:

(1)

wherein $R_1$ represents CHX=CY—COO—Z—,
wherein X represents —H or —$C_6H_5$,
Y represents —H or —$CH_3$, and

Z represents —, an ethyl group or a glycidyl group.

6. The liquid crystal device according to claim 4, wherein said photosensitive group is represented by Formula (2) shown below:

wherein Y represents —H or —CH₃.

7. The liquid crystal device according to claim 4, wherein said photosensitive group is represented by Formula (3) shown below:

wherein R₂ represents CHX=CY—CONH—, CH₂=CY— COO—(CH₂)₂—OCO— or CH₂=CY—COO—CH₂—;
X represents —H or —C₆H₅; and
Y represents —H or —CH₃.

8. The liquid crystal device according to claim 4, wherein said photosensitive group is represented by General Formula (4), (5) or (6) shown below:

wherein R₃ represents —H, an alkyl group or an alkoxy group,

9. The liquid crystal device according to claim 4, wherein said polyamino resin having the photosensitive group bonded in its molecule is a polyamide resin.

10. The liquid crystal device according to claim 4, wherein said polyamino resin having the photosensitive group bonded in its molecule is a polyimide resin.

11. The liquid crystal device according to claim 1, wherein said liquid crystal is a ferroelectric liquid crystal.

12. The liquid crystal device according to claim 11, wherein said ferroelectric liquid crystal is a chiral smectic liquid crystal;

13. The liquid crystal device according to claim 12, wherein said chiral smectic liquid crystal is set to have a film thickness which is thin enough to unwind spiral structure inherent therein when no electric field is applied.

14. The liquid crystal device according to claim 12, wherein said chiral smectic liquid crystal has a chiral smectic C phase or H phase.

15. The liquid crystal device according to claim 1, wherein said color filter is provided between the transparent electrode and the substrate.

16. The liquid crystal device according to claim 15, wherein an orientation-controlling film is formed on said transparent electrodes.

17. The liquid crystal device according to claim 16, wherein a uniaxially orienting axis is imparted to said orientation-controlling film.

18. The liquid crystal device according to claim 17, wherein said uniaxially orienting axis is imparted according to rubbing treatment.

19. The liquid crystal device according to claim 16, wherein an insulating film is provided between said transparent electrodes and said orientation-controlling film.

20. The liquid crystal device according to claim 15, wherein a protective film is provided between said color filter and said transparent electrodes.

21. The liquid crystal device according to claim 1, wherein one of said transparent electrodes functions as a scanning electrode and the other functions as a signal electrode, respectively, and said color filter is provided at every positin where said scanning electrode and said signal electrode form a crossing portion.

22. The liquid crystal device according to claim 21, wherein a blue color filter, a green color filter and a red color filter are each independently provided as said color filter at every position where said scanning electrode and said signal electrode form a crossing portion.

23. The liquid crystal device according to claim 22, wherein a film formed by a polyamino resin is provided between said blue color filter and said green color filter, between said blue color filter and said red color filter, or between said green color filter and said red color filter.

24. The liquid crystal device according to claim 23, wherein said polyamino resin is a polyamide resin.

25. The liquid crystal device according to claim 23, wherein said polyamino resin is a polyimide resin.

26. The liquid crystal device accorsing to claim 23, wherein said polyamino resin is a resin having a photosensitive group bonded in its molecule.

27. The liquid crystal device according to claim 23, wherein a light-intercepting material is contained in said film.

28. The liquid crystal device according to claim 1, wherein said coloring material is a particulate pigment.

29. The liquid crystal device according to claim 28, wherein said pigment is at least one of the group consisting of azo, phthalocyanine, indigo, anthraquinone, perylene, perynone, dioxazine, quinachridone, isoindolinone, phthalone and azomethine pigments.

30. A color filter which is obtained by forming into a film a coating solution containing a polyamino resin having a photosensitive group and a coloring material dispersed therein.

31. The color filter according to claim 30, wherein said polyamino resin is a polyamide resin.

32. The color filter according to claim 30, wherein said polyamino resin is a polyimide resin.

33. The color filter according to claim 30, wherein said photosensitive group is represented by Formula (1) shown below:

(1)

wherein $R_1$ represents $CHX=CY-COO-Z-$,
wherein X represents —H or —$C_6H_5$,
Y represents —H or —$CH_3$, and Z represents —, an ethyl group or a glycidyl group.

34. The color filter according to claim 28, wherein said photosensitive group is represented by Formula (2) shown below:

(2)

wherein Y represents —H or —$CH_3$.

35. The color filter according to claim 30, wherein said photosensitive group is represented by Formula (3) shown below:

(3)

wherein $R_2$ represents $CHX=CY-CONH-$, $CH_2=CY-COO-(CH_2)_2-OCO-$ or $CH_2=CY-COO-CH_2-$;
X represents —H or —$C_6H_5$; and
Y represents —H or —$CH_3$.

36. The color filter according to claim 30, wherein said photosensitive group is represented by Formula (4), (5) or (6) shown below:

(4)

wherein $R_3$ represents —H, an alkyl group or an alkoxy group, (5)

(6)

37. The color filter according to claim 30, wherein said coloring material is a particulate pigment.

38. The color filter according to claim 37, wherein said pigment is at least one of the groups consisting of azo, phthalocyanine, indigo, anthraquinone, perylene, perynone, dioxazine, quinachridone, isoindolinone, phthalone and azomethine pigments.

* * * * *

UNITED STATES PATENT AND TRADEMARK OFFICE
CERTIFICATE OF CORRECTION

PATENT NO. : 4,802,743
DATED : February 7, 1989
INVENTOR(S) : HIDEAKI TAKAO, ET AL.     Page 1 of 2

It is certified that error appears in the above-identified patent and that said Letters Patent is hereby corrected as shown below:

IN [56] REFERENCES CITED

U.S. PATENT DOCUMENTS, "Okbayadi et al." should read --Ohbayashi et al.--.

FOREIGN PATENT DOCUMENTS, "1045226 3/1986 Japan" should read --61-45226 3/1986 Japan-- and "1254605 11/1986 Japan" should read --61-254605 11/1986 Japan--.

IN FIG. 8

"84(Pb)" should read --84b(Pb)--.

COLUMN 6

Line 21, "(85a)." should read --(84b).--.

COLUMN 11

Line 51, "through-hole 13" should read --through-hole 14--.

COLUMN 17

Line 23, "$CH_2=CY-\ \ \ COO-(CH_2)_2-OCO-$" should read --$CH_2=CY-COO-(CH_2)_2-OCO-$ --.
    Line 62, "crystal;" should read --crystal.--.

UNITED STATES PATENT AND TRADEMARK OFFICE
CERTIFICATE OF CORRECTION

PATENT NO. : 4,802,743
DATED : February 7, 1989
INVENTOR(S) : HIDEAKI TAKAO, ET AL.            Page 2 of 2

It is certified that error appears in the above-identified patent and that said Letters Patent is hereby corrected as shown below:

COLUMN 18

Line 27, "positin" should read --position--.
    Line 44, "accorsing" should read --according--.
    Line 55, "quinachridone," should read --quinacridone,--.

COLUMN 19

Line 14, "claim 28," should read --claim 30,--.

COLUMN 20

Line 2, "$CH_2=CY-\quad COO-(CH_2)_2 \quad -OCO-$" should read
             --$CH_2=CY-COO-(CH_2)_2-OCO-$ --.
    Line 33, "quinachridone," should read --quinacridone,--.

Signed and Sealed this

Thirty-first Day of October, 1989

*Attest:*

DONALD J. QUIGG

*Attesting Officer*     *Commissioner of Patents and Trademarks*